(12) United States Patent
Ganance (10) Patent No.: US 6,865,775 B2
(45) Date of Patent: Mar. 15, 2005

(54) HOSPITAL BED CASTER APPARATUS

(75) Inventor: Francis C. Ganance, Cincinnati, OH (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 10/235,373

(22) Filed: Sep. 5, 2002

(65) Prior Publication Data

US 2003/0070233 A1 Apr. 17, 2003

Related U.S. Application Data

(60) Provisional application No. 60/317,271, filed on Sep. 5, 2001.

(51) Int. Cl.[7] .............................................. B60B 33/00
(52) U.S. Cl. ........................... 16/35 R; 5/620; 188/1.12
(58) Field of Search ...................... 5/620, 86.1; 188/17, 188/18 R, 18 A, 19, 20, 26, 24.11, 24.12, 24.19, 24.21, 24.22, 1.12, 73.1, 72.9, 75, 76, 77 R; 280/11.42, 428, 47.11, 79.11; 16/35 R (56) References Cited

U.S. PATENT DOCUMENTS

| | | | | |
|---|---|---|---|---|
| 2,687,546 A | * | 8/1954 | Oppenheimer | ................. 16/26 |
| 3,409,105 A | * | 11/1968 | Clinton | ........................ 188/29 |
| 3,879,796 A | | 4/1975 | Whyte | |
| 4,076,266 A | * | 2/1978 | Krausz | .................. 280/87.042 |
| 4,175,783 A | | 11/1979 | Pioth | |
| 4,248,445 A | * | 2/1981 | Vassar | ..................... 280/79.11 |
| 4,722,114 A | | 2/1988 | Neumann | |
| 4,723,808 A | | 2/1988 | Hines | |
| 4,788,741 A | | 12/1988 | Hilborn | |
| 4,896,922 A | | 1/1990 | Guthe | |
| 5,046,748 A | * | 9/1991 | Oat-Judge | ................ 280/47.34 |
| 5,083,341 A | | 1/1992 | Milbredt et al. | |
| 5,133,106 A | | 7/1992 | Milbredt et al. | |
| 5,139,116 A | * | 8/1992 | Screen | ...................... 188/1.12 |
| D329,011 S | | 9/1992 | Block | |
| 5,165,141 A | | 11/1992 | Soltani | |
| D340,182 S | | 10/1993 | Soltani | |
| D343,787 S | | 2/1994 | Finkeldey et al. | |
| D343,788 S | | 2/1994 | Soltani | |
| 5,343,988 A | * | 9/1994 | Bartsch et al. | ............. 190/18 A |
| 5,377,372 A | | 1/1995 | Rudolf et al. | |
| 5,456,336 A | * | 10/1995 | Bopp | .......................... 188/17 |
| 5,774,936 A | | 7/1998 | Vetter | |
| 6,158,757 A | * | 12/2000 | Tidcomb | ................. 280/250.1 |
| 6,240,713 B1 | * | 6/2001 | Thomas | ...................... 56/16.7 |
| 6,286,183 B1 | * | 9/2001 | Stickel et al. | ............... 16/35 R |
| 6,321,878 B1 | | 11/2001 | Mobley et al. | |
| 6,353,948 B1 | | 3/2002 | Bolden et al. | |
| 2001/0011393 A1 | | 8/2001 | Brooke et al. | |
| 2002/0033307 A1 | | 3/2002 | Mobley et al. | |

FOREIGN PATENT DOCUMENTS

| | | | | |
|---|---|---|---|---|
| CH | 570802 | | 12/1975 | |
| DE | 195 16 586 A | | 11/1996 | |
| GB | 2261173 A | * | 5/1993 | ............ A61H/3/04 |
| GB | 2 343 841 A | | 5/2000 | |
| GB | 2 349 126 A | | 10/2000 | |
| JP | 10211146 A | * | 8/1998 | ............ A47L/11/24 |
| JP | 11235362 A | * | 8/1999 | ............ A61G/5/02 |
| WO | WO 0051830 | | 9/2000 | |

* cited by examiner

Primary Examiner—Chuck Y. Mah
(74) Attorney, Agent, or Firm—Bose McKinney & Evans LLP (57) ABSTRACT

A caster apparatus is provided for a patient support. The caster apparatus includes a braking system.

17 Claims, 8 Drawing Sheets

HOSPITAL BED CASTER APPARATUS

This application claims the benefit of U.S. Provisional Application Ser. No. 60/317,271, filed Sep. 5, 2001, which is incorporated by reference herein.

BACKGROUND AND SUMMARY OF THE INVENTION

This invention relates to hospital beds and more particularly to hospital beds having wheels or casters attached to a base frame for rolling the bed from location to location and a braking and steering mechanism for controlling the casters.

Hospital beds are typically designed to be moved from location to location in a hospital or other health care facility. Therefore, beds have wheels or casters which permit the hospital bed to be rolled and steered between locations. During movement it is desirable to have free rolling wheels but upon reaching the desired location, brakes are usually applied to the wheels to maintain the bed at the desired location.

It is well known to provide hospital beds with brake/steer casters which include mechanisms for blocking the rotation of the casters, i.e. braking mechanisms, and mechanisms for blocking swiveling movement of the caster fork, i.e. anti-swivel or directional lock steering mechanisms. Some beds with four castered wheels include pedals located on opposite sides of the bed which control the braking and anti-swivel mechanisms in each caster. Examples of such beds are shown in U.S. Pat. No. 5,377,372 and PCT Publication No. WO 00/51830 both of which are incorporated herein by reference.

According to one embodiment of the present invention, a caster apparatus comprises a wheel having an axis of rotation, and a brake system including a brake member coupled to the wheel for rotation about the axis of rotation of the wheel and a cable having a first end portion coupled to the brake member and a second end portion. The apparatus also comprises an actuator coupled to the second end portion of the cable. The actuator is actuatable to move the cable, thereby rotating the brake member about the axis of rotation to brake the wheel.

In one illustrated embodiment, the apparatus further comprises a sleeve. The wheel is rotatably coupled to the sleeve and defines a first sweep pattern as the wheel rotates relative to the sleeve. The brake member defines a second sweep pattern as the wheel rotates relative to the sleeve. The first sweep pattern is illustratively greater than or equal to the second sweep pattern.

According to another embodiment of the present invention, a caster apparatus comprises a wheel including a first side wall, a second side wall, and an outer edge extending between the first and second side walls. The outer edge defines a circumference of the wheel, and the wheel is rotatable about an axis of rotation. The apparatus also comprises an external brake member coupled to the wheel adjacent the first side wall and within the circumference of the wheel, and an actuator coupled to the brake member. The actuator is actuatable to cause the brake member to prevent rotation of the wheel about the axis of rotation.

According to yet another embodiment of the present invention, a patient support apparatus comprises a patient support surface, a frame coupled to the patient support surface, and caster apparatus coupled to the frame. The caster apparatus includes a wheel and a brake system including an actuator, a cable, and a brake member. The cable has a first end portion coupled to the actuator and a second end portion coupled to the brake member. Actuation of the cable by the actuator causing the brake member to rotate about an axis to brake the wheel.

According to a further embodiment of the present invention, a caster apparatus comprises a wheel including a first side wall, a second side wall, and an outer edge extending between the first and second side walls. The outer edge defines a circumference of the wheel. The wheel is rotatable about an axis of rotation. The apparatus also comprises a brake member coupled to the wheel. The brake member includes a plunger movable to brake the wheel. The plunger includes a brake surface located below the outer edge of the wheel. The apparatus further includes an actuator coupled to the brake member. The actuator is actuatable to brake the wheel using vertical movement of the plunger and brake surface as the sole braking force on the wheel.

In one illustrated embodiment, the brake surface is a friction brake which engages an inner surface of the wheel located within the circumference of the wheel to brake the wheel. In another illustrated embodiment, the brake surface is a friction brake which engages a floor when actuated by the actuator. In yet another illustrated embodiment, the wheel includes an inner surface having a plurality of teeth, and the brake surface of the plunger also includes a plurality of teeth which mate with the plurality of teeth on the inner surface of the wheel to brake the wheel.

Additional features and advantages of the invention will become apparent to those skilled in the art upon consideration of the following detailed description of illustrated embodiments exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figures 1, 2, 3:
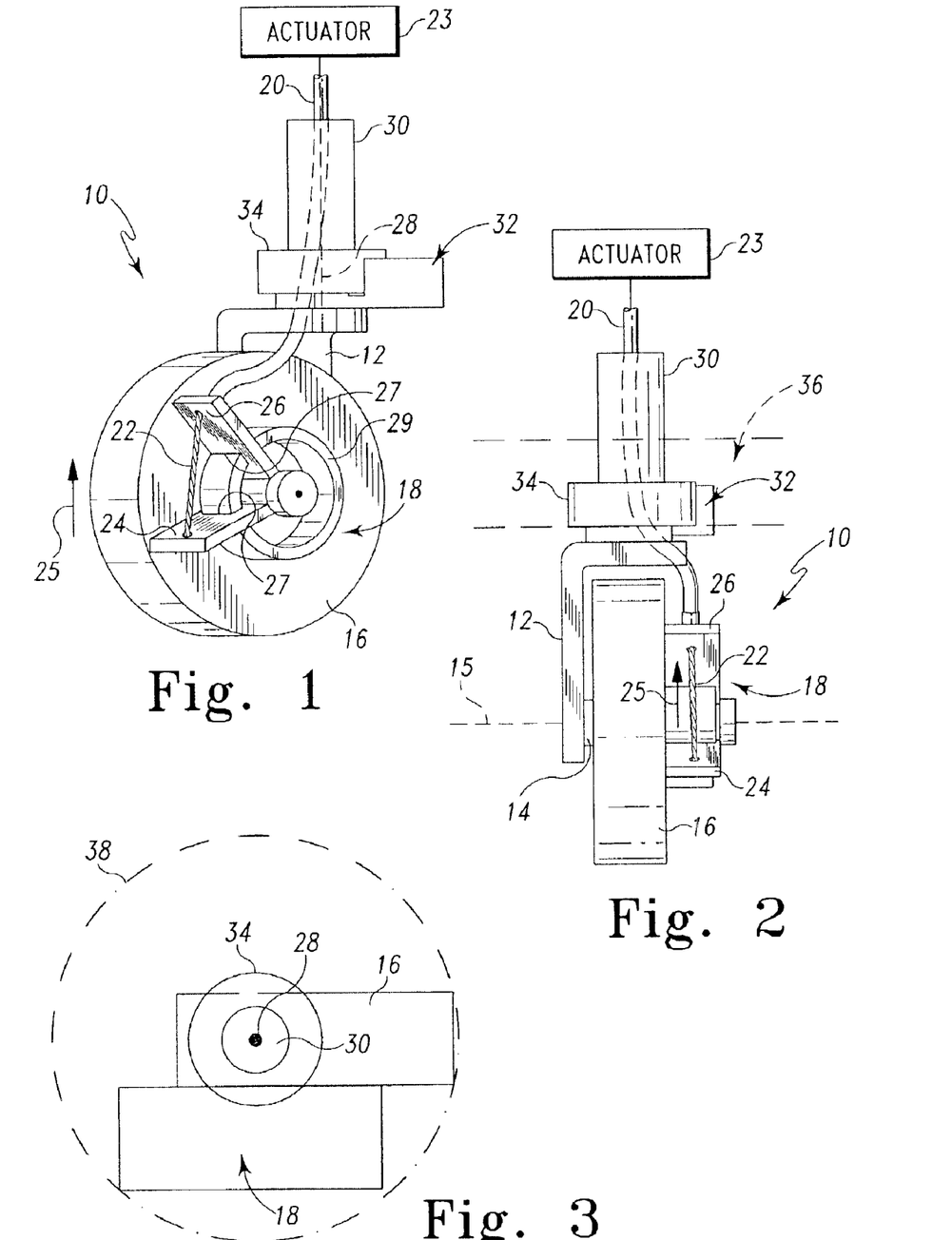
FIG. 1 is a perspective view of a first embodiment of a caster apparatus including a rotation brake and a steer brake.
FIG. 2 is an end view of the caster apparatus of FIG. 1.
FIG. 3 is an overhead view of the caster apparatus of FIGS. 1 and 2 showing a sweep of a wheel of the caster apparatus as the wheel rotates about a sleeve.

Referring to the drawings, FIGS. 1–3 illustrate one embodiment of a caster apparatus 10 of the present invention. The caster apparatus 10 includes a support fork 12 having a central axle 14 on which a wheel or caster 16 is mounted. A brake apparatus 18 is configured to selectively prevent rotation of caster 16 about an axis 15 of axle 14. Brake assembly 18 is actuated by a control such as, for example, a cable 21, such as a Bowden cable, which illustratively includes an internal wire 22 coupled to an actuator 23.

Illustratively, actuator 23 is a hand lever, a foot pedal, an electrical actuator, or a mechanical actuator located on a bed or other patient support such as a stretcher or chair. Actuator 23 is configured to move wire 22 when actuated by a caregiver.

Wire 22 is configured to move plate 24 toward plate 26 to apply the brake to caster 16. Plates 24, 26 each include a brake aperture 27. Brake apertures 27 are sized to allow a brake ring 29 to freely rotate therethrough when in a first position, and to brake against the brake ring 29 when in a second position. Illustratively, actuator 23 moves wire 22 in the direction of arrow 25 in FIGS. 1 and 2. Such movement of wire 22 moves plate 24 toward plate 26 and into the second position, braking against the brake ring 29. Alternatively, movement of wire 22 moves plate 24 toward plate 26 to apply a brake to axle 14 and thereby prevent rotation of caster 16. When actuator 23 is released, plates 24 and 26 automatically move back to the position shown in FIGS. 1 and 2 to release the brake. Movement of the plates 24, 26 alters the relative angle therebetween and also alters the angles of brake apertures 27 therein relative to the brake ring 29. Furthermore, the illustrated brake ring 29 has a constant diameter and thickness as shown in FIGS. 1 and 2.

In another embodiment, brake assembly 18 is also used to lock rotation of caster 16 and fork 12 about an axis 28 of sleeve 30. In this embodiment, a brake component 32 is mounted adjacent a bearing 34. Brake component 32 may be a cam type brake where the vertical axle of the caster is not completely round but rather has surfaces to be selectively engaged by another surface or arm to brake rotation. Alternatively, brake component 32 can be a spring loaded arm that, when engaged, enters apertures in the vertical axle to thereby brake rotation.

Since the brake assembly 18 is mounted adjacent the caster 16, the height of sleeve 30 can be substantially reduced or sleeve 30 may be eliminated so that a bed frame 36 can be mounted close to caster 16. Therefore, the frame 36 can be positioned as close to the floor as possible so that a patient support surface of the bed may be moved to a very low position to facilitate a patient getting into or out of the bed or other patient support.

When the caster 16 rotates around axis 28, a caster sweep pattern is illustrated by line 38 in FIG. 3. No bed components may be mounted below frame 36 within the area defined by the sweep pattern 38. The brake assembly 18 may be mounted at any location on caster 16, preferably so that an outer dimension of brake assembly 18 as illustrated diagrammatically in FIG. 3 does not extend beyond the caster sweep dimension 38. Therefore, brake 18 may be added to caster 16 without taking up additional usable space underneath the bed frame 36. By mounting the brake 18 on the caster 16, the height of sleeve 30 can be reduced or sleeve 30 can be eliminated from the caster mechanism so that the bed or other patient support can be moved to a lower position. It is understood that other types of caster mounted braking assemblies may be used in accordance with the present invention. It should also be appreciated that a cover (not pictured) may be used with the present embodiment so that brake assembly 18 is not openly exposed.

Figure 4:
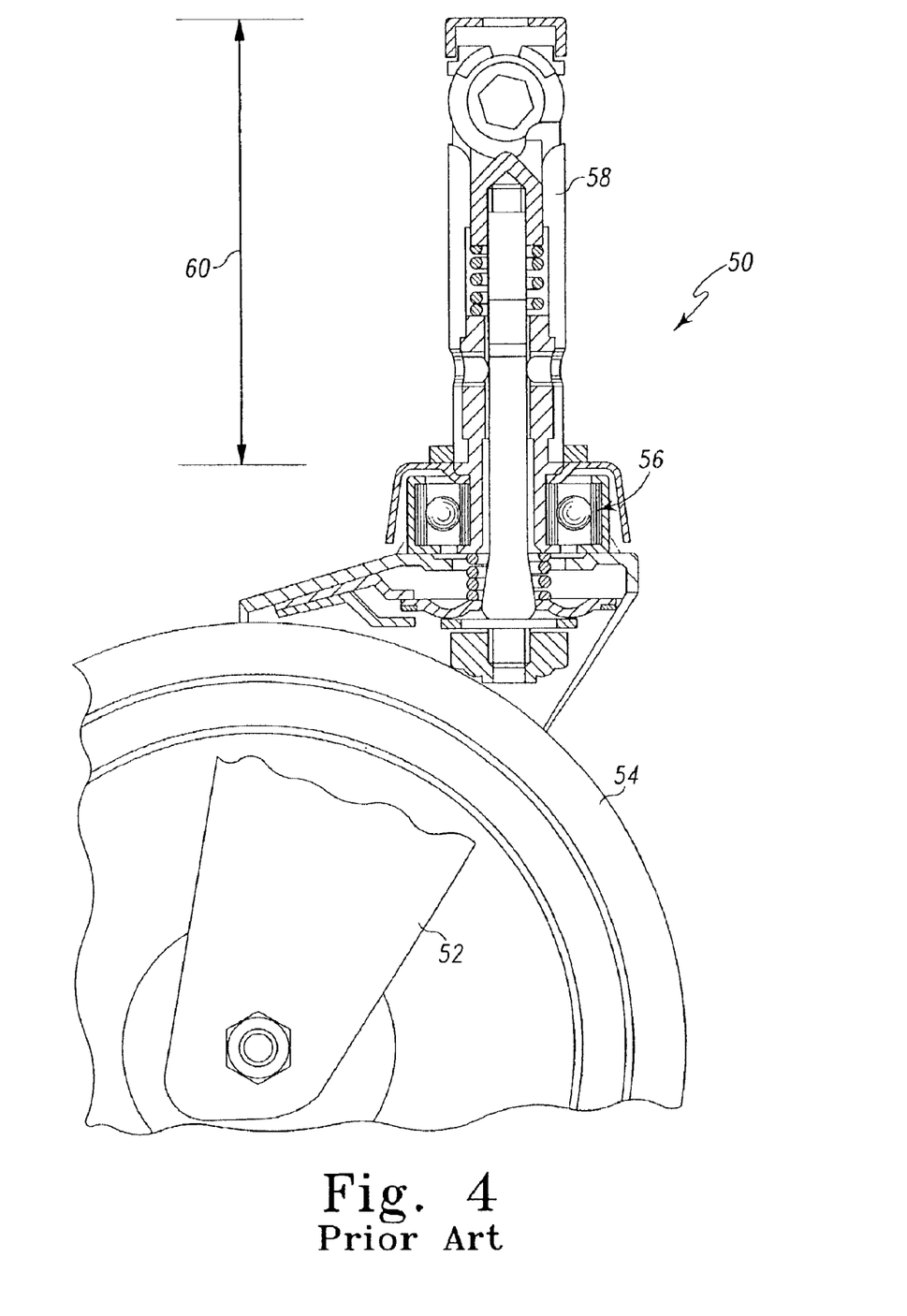
FIG. 4 is a cross sectional view of a prior art caster apparatus.

FIG. 4 illustrates a prior art caster braking mechanism 50 which includes fork arms 52 for holding a caster 54. Bearings 56 permit rotation of the fork 52 and caster 54. An outer plug-in sleeve 58 is substantially narrower than bearings 56 and extends upwardly a large distance. This large sleeve 58 hampers efforts to reduce the height of a patient support on which the caster is mounted. The height of sleeve 58 illustrated by dimension 60 is often up to four inches which is a large distance when efforts are being made to reduce the overall height of the patient support.

Figure 5:
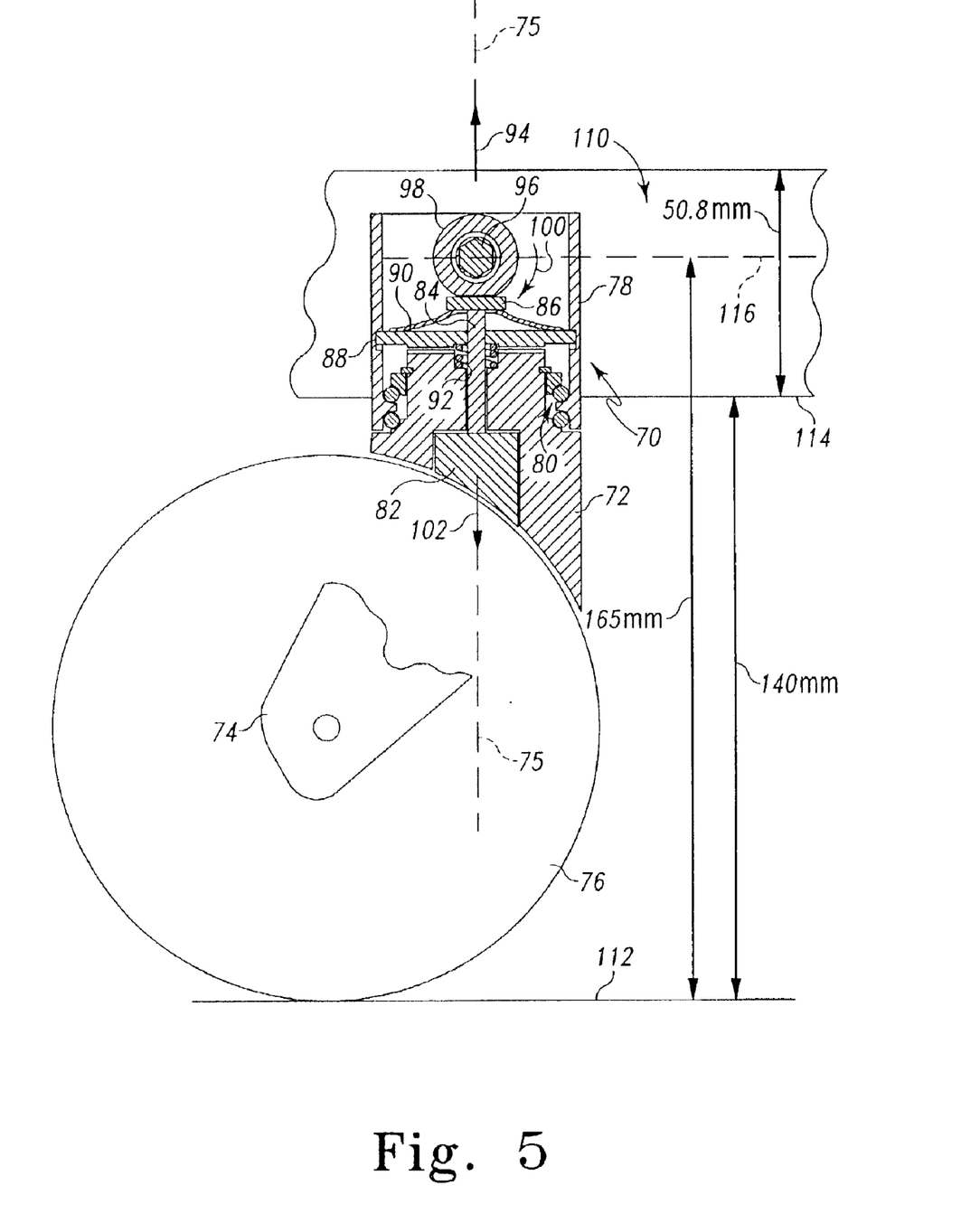
FIG. 5 is a cross sectional view of a second embodiment of a caster apparatus of the present invention.
Figure 6:
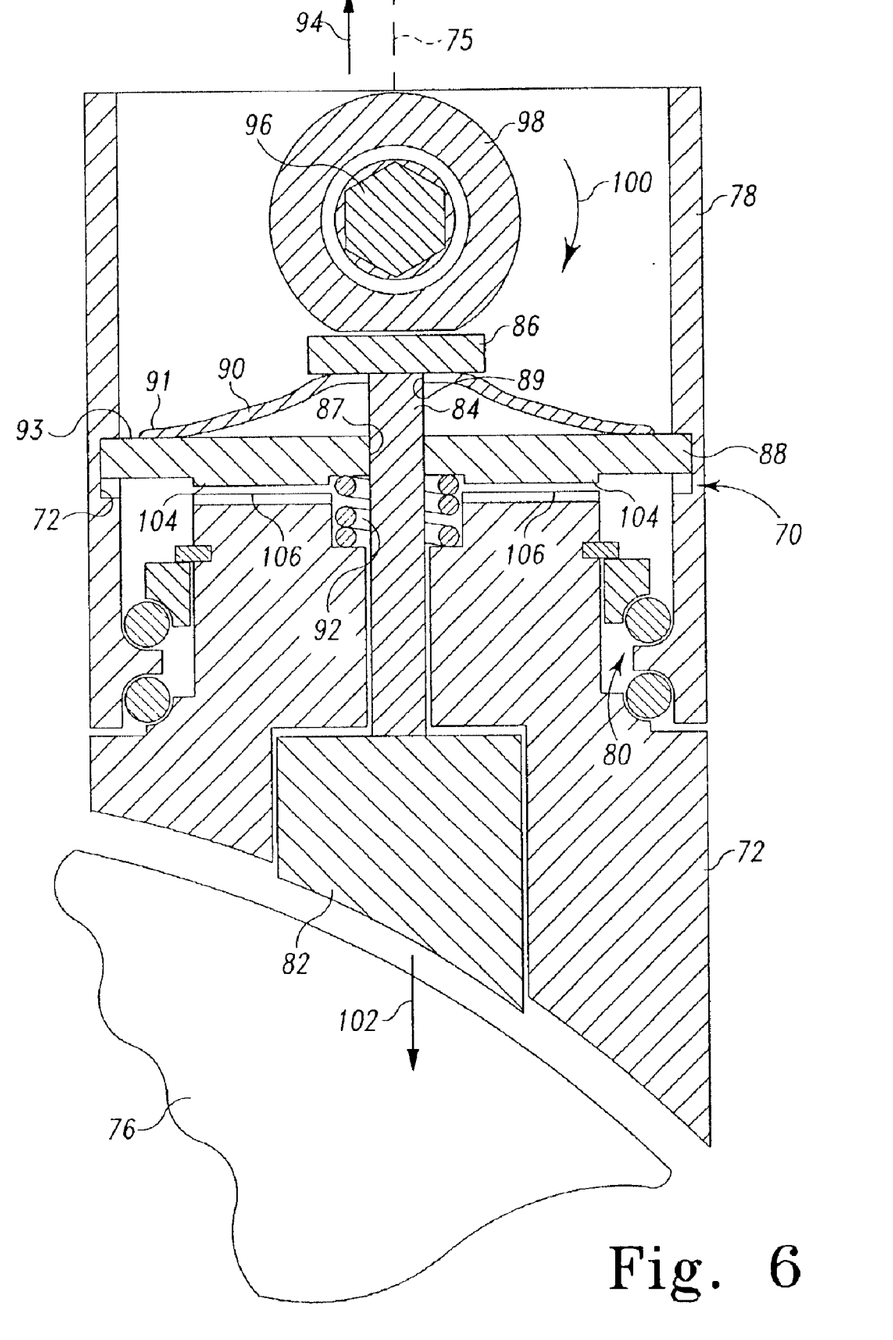
FIG. 6 is an enlarged cross sectional view of brake/steer mechanism of the caster apparatus of FIG. 5.

Another embodiment of the present invention is illustrated in FIGS. 5 and 6. The caster braking apparatus 70 includes a support 72 coupled to a fork 74 which is coupled to a caster 76. Support 72 is rotatably coupled to an outer sleeve 78 by bearings 80. An internal brake 82 is coupled to a pin 84 including an upper head 86. Pin 84 passes through a central aperture 87 in a plate 88 which is located within a notch 79 in sleeve 78. Pin 84 also extends through a central aperture 89 formed in spring member 90. Spring member 90 is configured to engage head 86 to bias the pin 84 upwardly in the direction of arrow 94. An end portion 91 of spring member 90 engages a top surface 93 of plate 88. An internal spring 92 also biases the plate 88 upwardly in the direction of arrow 94. An actuator rod 96 is coupled to a cam 98. Rotation of actuator rod 96 in the direction of arrow 100, typically by a foot pedal, causes movement of head 86, pin 84 and brake 82 downwardly in the direction of arrow 102. Therefore, brake 82 engages an outer edge of caster 76 to brake the caster.

As best shown in FIG. 6, plate 88 includes spaced apart tabs 104 which are configured to enter complementary grooves or notches 106 formed in support 72 when the pin 84 is moved downwardly in the direction of arrow 102 by a first distance to block swiveling rotation of the support 72 and caster 76 about axis 75. Movement of the pin 84 a second distance causes brake 82 to engage caster 76. Braking apparatus 70 can be set so that braking occurs before swiveling is prevent by adjusting the spring constants of spring member 90 and spring 92. In other words, the spring constants can be chosen so that initial downward movement of pin 84 compresses spring member 90 so that brake 82 engages caster 76. Further movement of pin 84 compresses spring 92 so that tabs 104 enger grooves 106 to prevent swiveling.

As illustrated in FIGS. 5 and 6, the sleeve 78 is wider than the bearings 80. By making the sleeve 78 wider, the overall height of the sleeve 78 is reduced compared to prior art sleeves. Therefore, when the sleeve 78 is coupled to a hospital bed frame 110 shown in FIG. 5, the overall height of the bed frame is reduced. The distance from the ground 112 to a bottom edge 114 of frame 110 for five inch caster 76 is 140 millimeters. The frame thickness is illustratively 50.8 millimeters. Therefore, the distance from the ground 112 to a center line of actuator 96 illustrated at location 116 is illustratively 165 millimeters. Further, the distance from the ground to the upper edge of the frame is 190.8 millimeters. It is understood that other types of conventional caster brake/steer mechanisms may be used in the wider sleeve 78 of the present invention.

Figure 7:
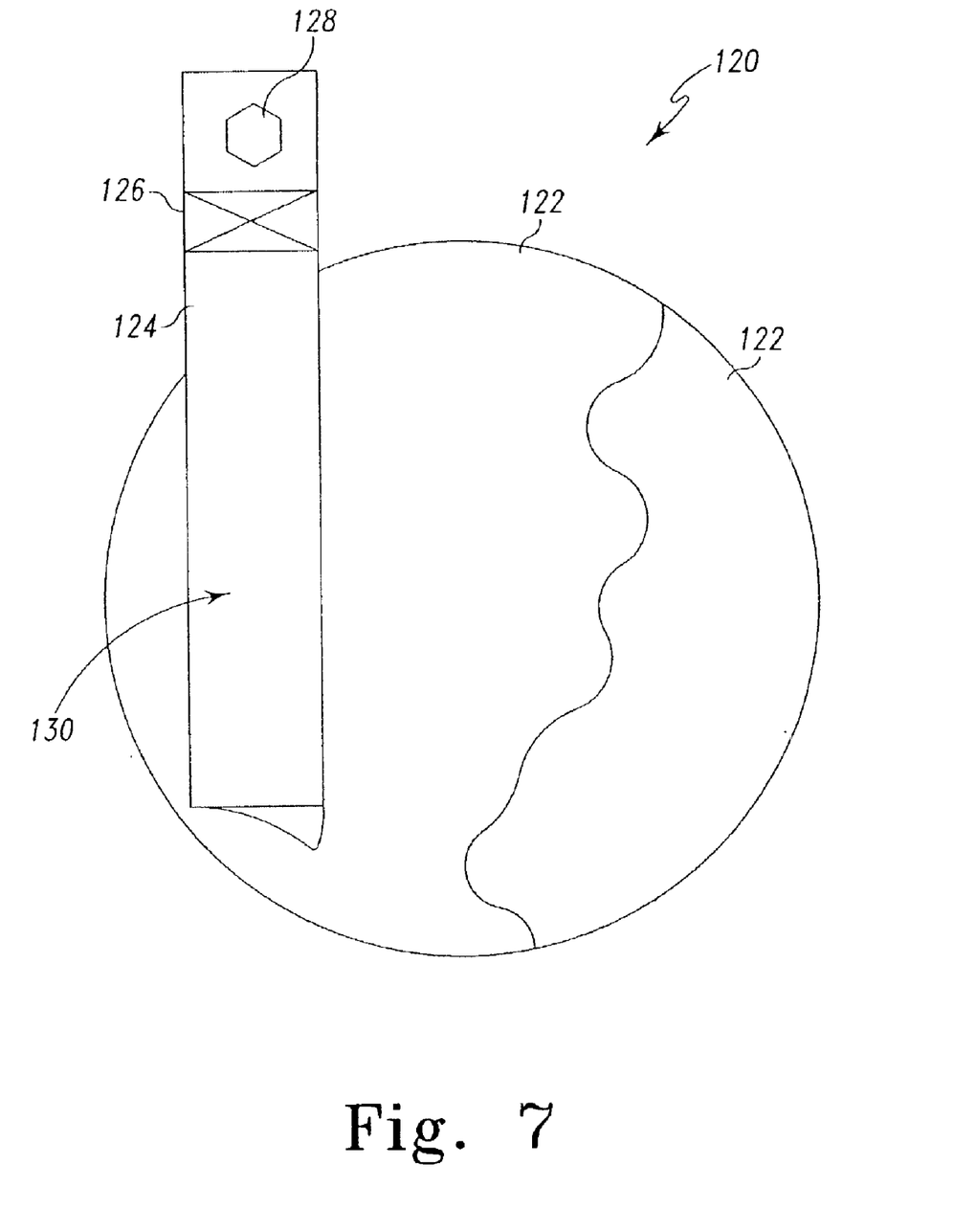
FIG. 7 is a cut away side elevation view of a third embodiment caster apparatus.

Another embodiment of the present invention is configured for use with a dual wheel caster such as illustrated in U.S. Pat. Nos. 5,133,106 and 5,139,116 which are incorporated herein by reference. As illustrated in FIG. 7, the caster apparatus 120 includes spaced apart first and second wheels 122 and a sleeve 124 extending into a central portion between the wheels 122. Rotation brake components 130 are located within the sleeve 124 below an upper bushing 126. An actuator 128 is used to actuate the rotation brake components 130 as well as steer brake components 132. Illustratively, the rotation brake components 130 may include a brake pad which engages an interior portion of wheels 122 or the floor, a gear component which engages gears on wheels 122 to brake the wheels 122, or other suitable braking mechanisms.

Figures 8, 9, 11, 12, 13:
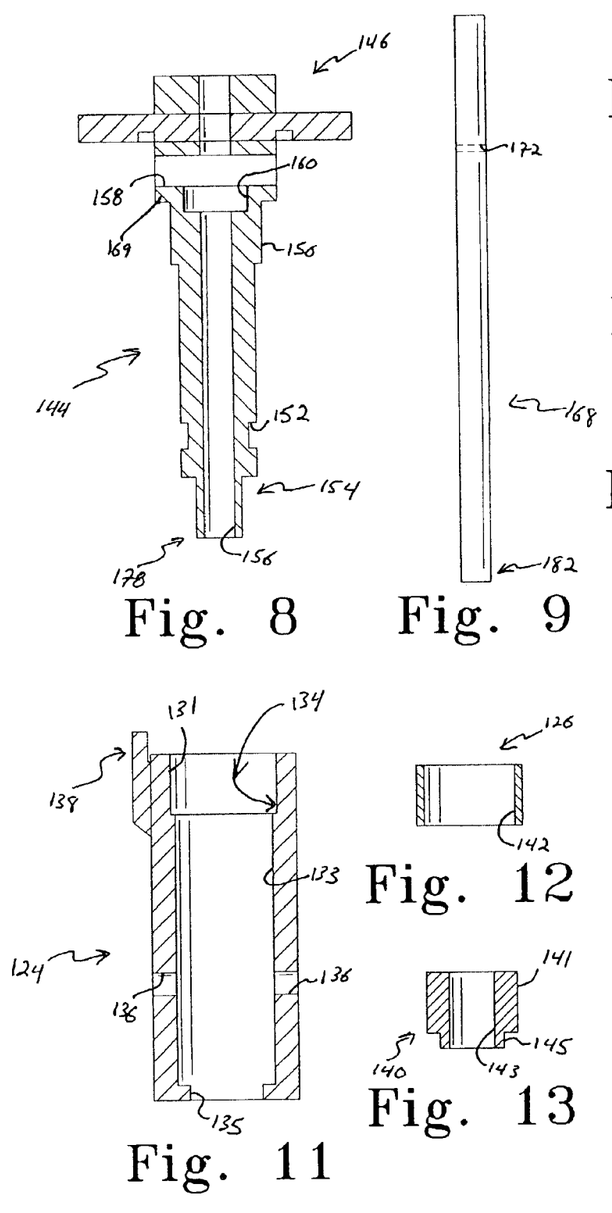
FIG. 8 is cross sectional view of a plunger of the caster of FIG. 7.
FIG. 9 is a side elevation view of an actuation rod of the caster of FIG. 7.
FIG. 11 is a cross sectional view of a sleeve of the caster of FIG. 7.
FIG. 12 is a cross sectional view of an upper bushing of the caster of FIG. 7.
FIG. 13 is a cross sectional view of a lower bushing of the caster of FIG. 7.

FIG. 11 shows a cross section of sleeve 124. Sleeve 124 is preferably constructed from weldable steel. Sleeve 124 includes a multi-diameter plunger/steer axle bore 134 defined therein, a plurality of plunger securing bores 136, and a steer lock pin 138. Illustratively, bore 134 includes a top portion 131, a central portion 133, and a lower portion 135.

FIGS. 12 and 13 show cross sections of lower ring bushing 140 and upper ring bushing 126. The ring bushings 140, 126 each include a plunger bore 142, 143 respectively. Both bushings 126, 140 are illustratively constructed from bronze. Lower ring bushing 140 has a body with an outer surface 141 and a smaller diameter bottom end wall 145. Lower ring bushing 140 is press fit into the bottom of plunger bore 134 of sleeve 124 so that bottom end wall 145 is received within the lower portion 135 of bore 134. Upper ring bushing 126 is likewise press fit into the top portion 131 of plunger bore 134.

FIG. 8 shows a cross section of a plunger/steer axle 144. Plunger 144 includes a frame mount 146, a steer stop plate mount 148 beneath frame mount 146, an upper bushing interface section 150 beneath steer stop plate mount 148, an annular securing notch or groove 152, a lower bushing interface section 154 below annular securing groove 152, an actuation rod bore 156 centrally and axially located within plunger 144, a bias rod bore 158 perpendicular to actuation rod bore 156 and located within steer stop plate mount 148, and a spring aperture 160 located at the lower side of the intersection of actuation rod bore 156 and bias rod bore 158.

Figure 14:
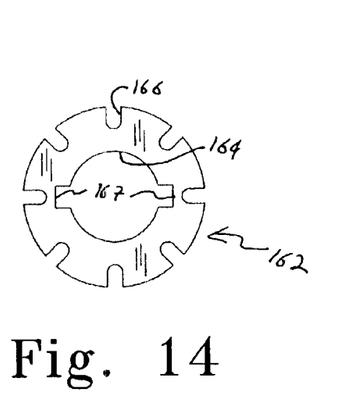
FIG. 14 is an overhead view of a steer stop plate of the caster of FIG. 7.

FIG. 14 shows a steer stop plate 162. Steer stop plate 162 illustratively is a round substantially flat member that includes a plunger bore 164 and a plurality of steer lock apertures 166. Plunger bore 164 is sized to receive steer stop plate mount 148 of plunger 144 therein. Notches 167 formed in plate 162 engaged tabs 189 on mount 148 to prevent rotation of the plate 162 relative to the plunger 144. Notches 167 formed in plate 162 engage tabs 189 on mount 148 to prevent rotation of the plate 162 relative to the plunger 144. Steer lock apertures 166 are sized and located to selectively receive steer lock pin 138 therein.

Figure 10:
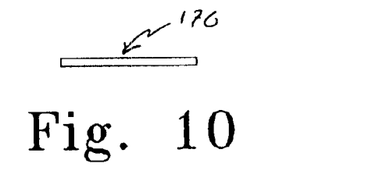
FIG. 10 is a side elevation view of a bias rod of the caster of FIG. 7.
Figure 15:
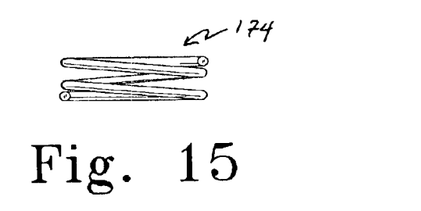
FIG. 15 is a side elevation view of a large spring of the caster of FIG. 7.
Figure 16:
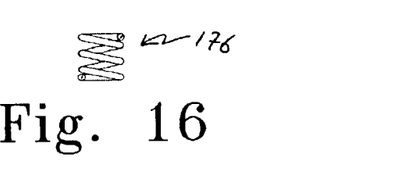
FIG. 16 is a side elevation view of a small spring of the caster of FIG. 7.

FIGS. 9 and 10 show an actuation rod 168 and a bias rod 170. Actuation rod 168 has a bias rod aperture 172 therein sized to fixedly receive bias rod 170 therein. Bias rod 170 is longer than the length of bias rod bore 158. Large and small springs 174 and 176 are shown in FIGS. 15 and 16.

Figure 17:
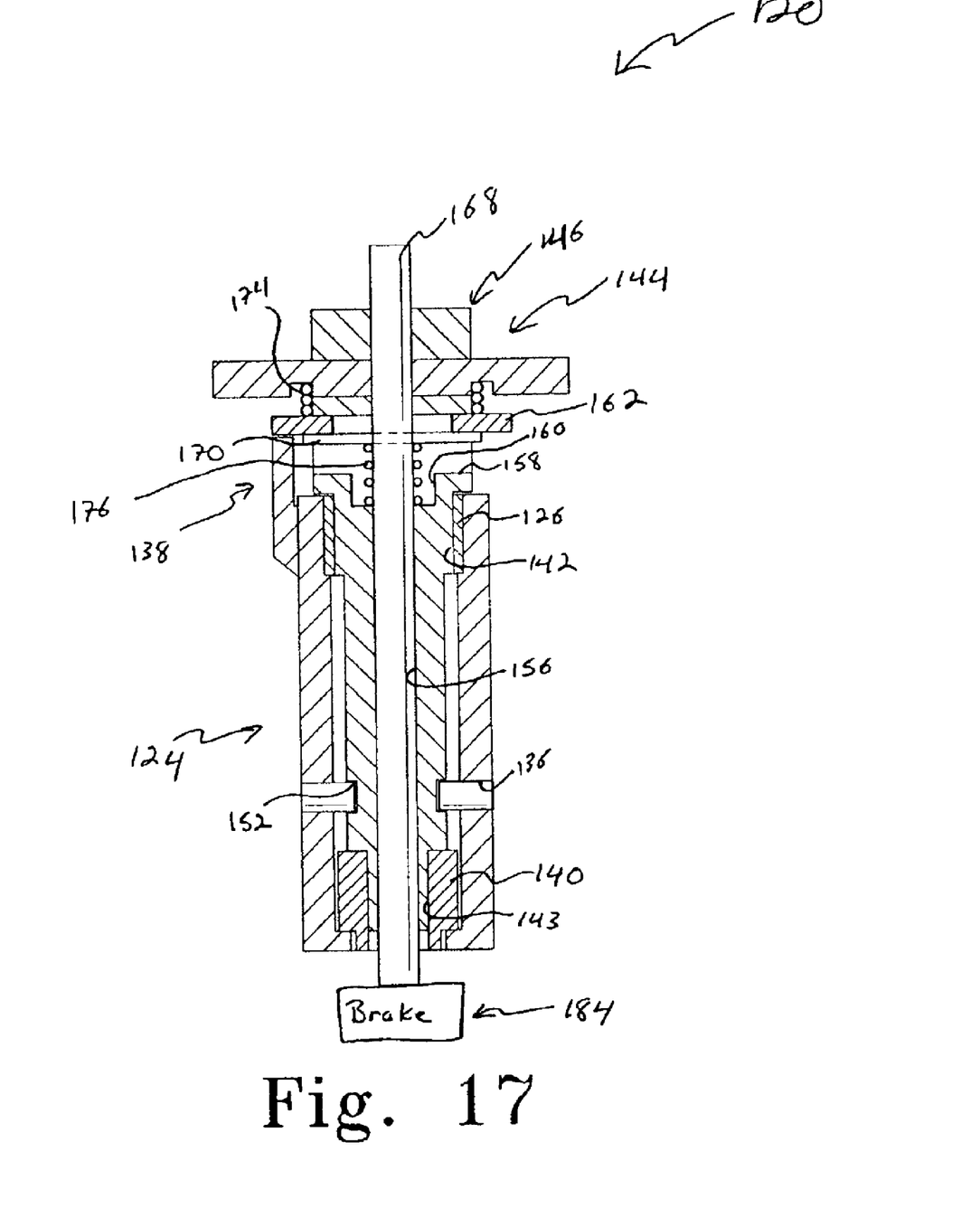
FIG. 17 is a cross sectional view of the caster of FIG. 7 in an unbraked position.

Assembled caster apparatus is shown in FIG. 17 in a non-actuated position. To achieve the assembled caster apparatus 120, the large spring 174 is first slipped over bottom end 178 of plunger 144 and moved upward until spring 174 is around steer stop plate mount 148 and abutting frame mount 146. Steer stop plate 162 is then likewise slipped over bottom end 178 of plunger 144 such that plunger 144 is within plunger bore 164. Steer stop plate 162 is then moved upward and oriented such that it is around steer stop plate mount 148 and abutting large spring 174.

Small spring 176 is placed within spring aperture 160. Actuation rod 168 is then placed inside actuation rod bore 156 and spring 176 such that bias rod aperture 172 aligns with bias rod bore 158. Bias rod 170 is then inserted into bias rod bore 158 and bias rod aperture 172 and fixed such that spring 176 is below bias rod 170 and steer stop plate 162 is above bias rod 170. Once plunger 144 is so assembled, small spring 176 abuts bias rod 170, bias rod 170 abuts steer stop plate 162, steer stop plate 162 abuts large spring 174, and large spring 174 abuts frame mount 146. Actuation rod 168 may travel vertically within actuation rod bore 156 with the distance of the travel limited by the interface of the bias rod 170 and the bias rod bore 158. Small spring 176 is a stronger spring than large spring 174. Small spring 176 is enough stronger such that in a non-actuated state, small spring 176 biases bias rod 170 and actuation rod 168 upwards, thereby biasing steer stop plate upwards and compressing large spring 174.

Assembled plunger 144 is then placed within plunger bores 142, 134, and 142 of the upper ring bushing 126, sleeve 124, and lower ring bushing 140 respectively. When so placed, lower bushing interface section 154 abuts lower ring bushing 140, upper bushing interface section 150 abuts upper ring bushing 126, annular securing aperture 152 is horizontally aligned with plunger securing bore 136, actuation rod 168 extends out of the bottom of sleeve 124, and steer stop plate mount 148 extends above sleeve 124. Posts 180 are then inserted into plunger securing bores 136. Posts 180 fixedly engage the walls of securing bores 136 and enter annular securing aperture 152, thereby preventing the removal of plunger 144 while still allowing rotational motion of plunger 144 relative to sleeve 124.

Figure 18:
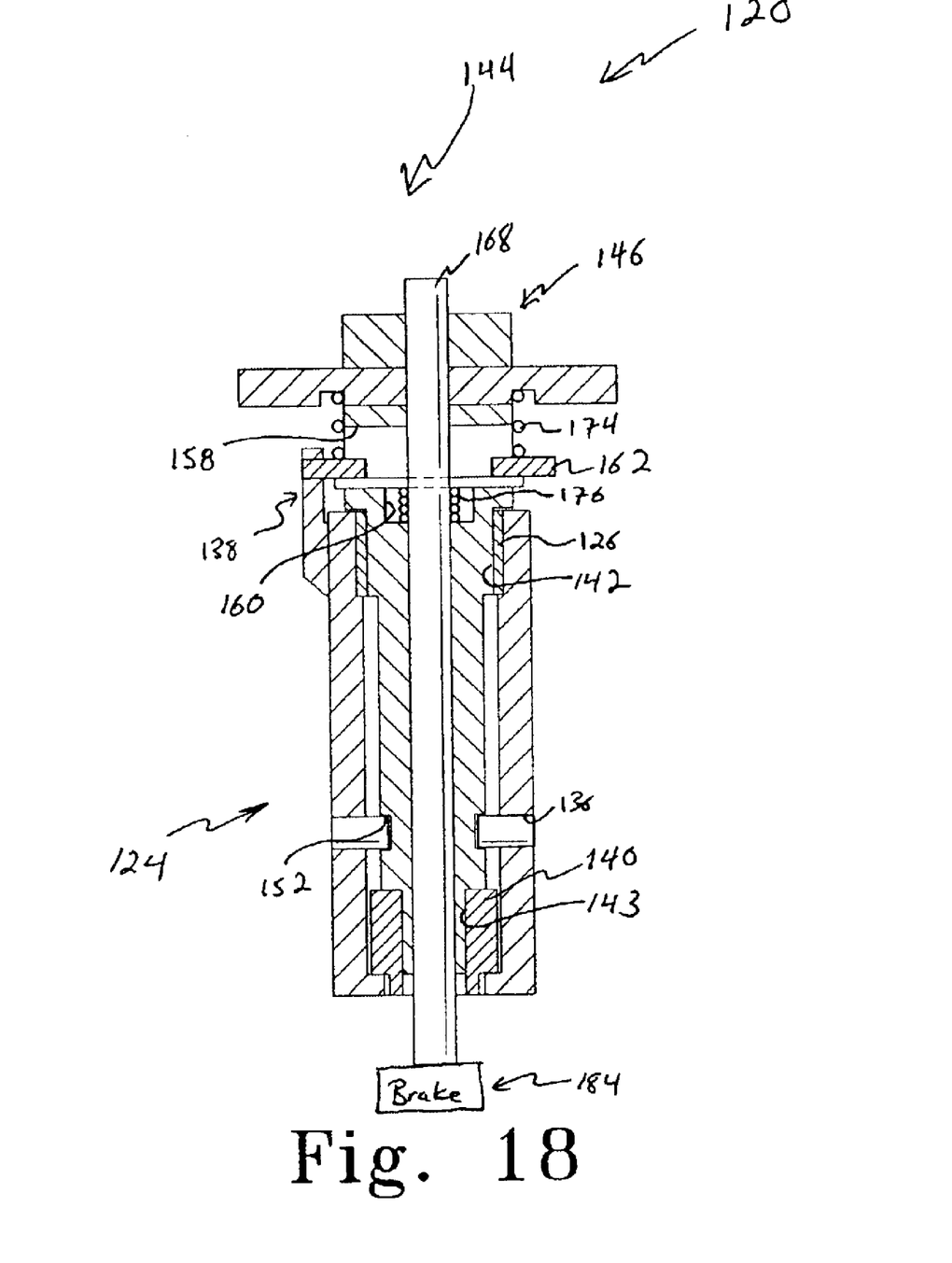
FIG. 18 is a cross sectional view of the caster of FIG. 7 in a braked position.

FIG. 18 shows the caster apparatus 120 of FIG. 17 in an actuated position. Actuator 128, preferably similar to actuator rod and cam 96, 98 as shown in FIG. 5, is rotated to cause actuation rod 168 to lower. Lowering of actuation rod 168 causes bias rod 170 to likewise lower and compress small spring 176. Compression of small spring 176 allows large spring 174 to downwardly bias steer stop plate 162. Steer stop plate 162 then moves downwardly with bias rod 170 if a steer lock aperture 166 is vertically aligned with steer lock pin 138 thereby locking steer rotation of the caster apparatus. However, if a steer lock aperture 166 is not vertically aligned with steer lock pin 138, steer lock pin abuts an underside of steer stop plate, bias rod 170 disengages from steer stop plate 162, and steer stop plate 162 remains at the height of the top of steer lock pin 138. Further rotation of sleeve 124 relative to plunger 144 and attached steer stop plate 162 aligns a steer lock aperture 166 with steer lock pin 138 at which time the downward bias of large spring 174 pushes steer stop plate 162 down such that steer lock pin 138 is within one of the plurality of steer lock apertures, thereby arresting steer rotation. The frequency and location of steer lock apertures 166 ensures that the caster apparatus is prevented from substantially rotating once actuation rod 168 is lowered.

Lowering of the actuation rod 168 also causes locking of wheel 122 rotation. A lower end 182 of actuation rod 168 has a brake 184 coupled thereto. Brake 184 preferably assumes one of the following three embodiments. First embodiment brake 184 includes a brake block that moves vertically with actuation rod 168 to enmesh with teeth on an inside surface of wheels 122. Second embodiment brake 184 includes a brake block similar to internal brake 82 of FIGS. 5 and 6. However, brake block of second embodiment brake 184 moves vertically with actuation rod 168 to engage the inside surface of wheels 122 as opposed to the outer surface as shown in FIGS. 5 and 6. Third embodiment brake 184 includes a brake block that moves vertically with actuation rod 168 to frictionally engage the floor on which the wheels 122 are located. Third embodiment brake 184 requires a longer actuation rod 168 or longer brake block than the previous two embodiments to be able to reach the floor rather than a portion of the wheel.

Rotation of actuator 128 back to its original position allows small spring 176 to act upon bias rod 170 to push actuation rod 168 upwards, thereby disengaging the brake block and steer stop plate 162.

Although the invention has been described in detail with reference to certain preferred embodiments, variations and modifications exist within the scope and spirit of the present invention.

What is claimed is:

1. A patient support apparatus comprising:
  a patient support surface;
  a frame coupled to the patient support surface; and
  a caster apparatus coupled to the frame, the caster apparatus including a wheel and a brake system including an actuator, a cable, and a brake member, the cable having a first end portion coupled to the actuator and a second end portion coupled to the brake member, actuation of the cable by the actuator causing the brake member to rotate about an axis to brake the wheel, the brake member rotating about an axis of rotation that is parallel to an axis of rotation for the wheel.

2. A patient support apparatus comprising:
  a patient support surface;
  a frame coupled to the patient support surface;
  a sleeve coupled to the frame; and
  a caster apparatus coupled to the frame, the caster apparatus including a wheel and a brake system including an actuator, a cable, and a brake member, the cable having a first end portion directly coupled to the actuator and a second end portion coupled to the brake member, actuation of the cable by the actuator causing the brake member to rotate about an axis to brake the wheel the brake member being positioned on an exterior surface of the wheel, the wheel being rotatably coupled to the sleeve and defining a first sweep pattern as the wheel rotates relative to the sleeve, the brake member defining a second sweep pattern as the wheel rotates relative to the sleeve, the first sweep pattern being greater than or equal to the second sweep pattern.

3. A patient support apparatus comprising:
  a patient support surface;
  a frame coupled to the patient support surface; and
  a caster apparatus rotatably coupled to the frame, the caster apparatus including a wheel and a brake member coupled to the wheel, the brake member being external and horizontally adjacent to the wheel, the wheel defining a first sweep perimeter as the caster apparatus rotates relative to the frame, and the brake member defining a second sweep perimeter as the caster apparatus rotates relative to the frame, the first sweep perimeter being greater than or equal to the second sweep perimeter.

4. The apparatus of claim 3, wherein the second sweep perimeter is positioned within the first sweep perimeter.

5. The apparatus of claim 3, wherein application of the brake member prevents rotation of the wheel relative to the brake member and while permitting rotation of the caster apparatus relative to the frame.

6. The apparatus of claim 3, wherein the brake member is coupled to an actuator by a cable.

7. The apparatus of claim 6, wherein the actuator pulls the cable and moves a portion of the brake member relative to the wheel.

8. A patient support apparatus comprising:
  a patient support surface;
  a frame coupled to the patient support surface; and
  a caster apparatus rotatably coupled to the frame, the caster apparatus including a wheel and a brake member coupled to the wheel, the brake member being external to the wheel, the wheel defining a first sweep perimeter as the caster apparatus rotates relative to the frame, and the brake member defining a second sweep perimeter as the caster apparatus rotates relative to the frame, the first sweep perimeter being greater than or equal to the second sweep perimeter, the wheel defining a circumference and the brake member being located entirely within the circumference of the wheel.

9. A patient support apparatus comprising:
  a patient support surface;
  a frame coupled to the patient support surface; and
  a caster apparatus rotatably coupled to the frame, the caster including a wheel and a brake member coupled to the wheel, the wheel including a brake ring and the brake member including an aperture to at least partially receive the brake ring therein.

10. The apparatus of claim 9, wherein the brake member has a first position wherein the brake ring slidably engages the brake member and a second position wherein the break ring fixedly engages the brake member.

11. The apparatus of claim 10, wherein moving the brake member from the first position to the second position includes altering an angle of the aperture relative to the brake ring.

12. The apparatus of claim 9, wherein the brake ring has a constant thickness and diameter.

13. The apparatus of claim 9, further including an actuator coupled to a cable, the cable being coupled to the brake member.

14. The apparatus of claim 13, wherein actuation of the actuator results in the alteration of an angle of the aperture relative to the brake ring.

15. The apparatus of claim 9, wherein the brake member includes first and second plates aligned at an acute angle relative to each other, the first and second plates having first and second apertures, respectively, which receive the brake ring therein.

16. The apparatus of claim 15, wherein the brake ring has a transverse axis and the first and second plates extend radially away from the transverse axis.

17. The apparatus of claim 16, further comprising an actuator coupled to at least one of the first and second plates, the actuator being configured to selectively move a distal end of the first plate toward a distal end of the second plate to adjust the angle between the first and second plates, thereby braking the brake ring.

* * * * *